United States Patent
Hogg

(10) Patent No.: US 9,239,253 B2
(45) Date of Patent: Jan. 19, 2016

(54) DIAL GAUGE

(71) Applicant: Draeger Safety UK Limited, Blyth (GB)

(72) Inventor: Simon C. Hogg, Whitley Bay (GB)

(73) Assignee: Draeger Safety UK Limited (GB)

( * ) Notice: Subject to any disclaimer, the term of this patent is extended or adjusted under 35 U.S.C. 154(b) by 33 days.

(21) Appl. No.: 14/052,965

(22) Filed: Oct. 14, 2013

(65) Prior Publication Data
US 2014/0111965 A1   Apr. 24, 2014

(30) Foreign Application Priority Data
Oct. 19, 2012   (GB) .................................. 1218827.2

(51) Int. Cl.
*G01D 11/28*   (2006.01)
*G01D 13/02*   (2006.01)
*G01D 13/28*   (2006.01)

(52) U.S. Cl.
CPC ................ *G01D 11/28* (2013.01); *G01D 13/02* (2013.01)

(58) Field of Classification Search
CPC ... G01D 5/00; G01D 26/35306; G01D 11/28; G01D 13/02; G02B 6/00–6/0096
USPC ......................... 362/311.01–311.15, 600–634
See application file for complete search history.

(56) References Cited

U.S. PATENT DOCUMENTS

| | | | | |
|---|---|---|---|---|
| 2,413,848 A * | 1/1947 | Simpson | .................. | G01R 1/02 116/328 |
| 3,699,915 A * | 10/1972 | Greene | .................. | G01D 11/28 116/287 |
| 4,559,582 A * | 12/1985 | Scardilli | ................. | G12B 11/04 362/23.01 |
| 4,771,368 A | 9/1988 | Tsukamoto et al. | | |
| 4,807,090 A * | 2/1989 | Mandellos | ............. | G01D 11/28 116/287 |
| 5,915,822 A * | 6/1999 | Ogura | ..................... | B60K 37/02 362/23.15 |
| 6,318,872 B1 | 11/2001 | Kato et al. | | |
| 2010/0020528 A1 | 1/2010 | Feit | | |

FOREIGN PATENT DOCUMENTS

| | | |
|---|---|---|
| CA | 1285918 | 7/1991 |
| GB | 2 489 050 | 9/2012 |

(Continued)

OTHER PUBLICATIONS

Search Report issued Feb. 14, 2014 in co-pending European Application No. 13188137.7.

(Continued)

*Primary Examiner* — Anh Mai
*Assistant Examiner* — Nathaniel Lee
(74) *Attorney, Agent, or Firm* — DLA Piper LLP (US)

(57) ABSTRACT

There is disclosed a dial gauge comprising a dial plate having a dial face including angularly spaced markings indicating values; a pointer disposed at a front side of the dial plate and angularly moveable over the dial face with respect to the markings so as to indicate a reading. An illumination source is provided which is arranged to emit illumination light and which is disposed below the dial plate. The gauge further comprises a light guide arranged to guide illumination light from below the dial plate to the front side of the dial plate so as to illuminate the dial face from above. There is also disclosed a mechanical pressure gauge comprising a dial gauge and a breathing apparatus comprising a cylinder of breathable gas fluidically coupled to a pressure gauge which is configured to display the pressure of the breathable gas.

20 Claims, 3 Drawing Sheets

(56) References Cited

FOREIGN PATENT DOCUMENTS

| JP | 10-019610 | 1/1998 |
| JP | 2006-017587 A | 1/2006 |
| JP | 2007-003292 A | 1/2007 |
| JP | 2007-017166 | 1/2007 |
| JP | 2010-175472 A | 8/2010 |
| JP | 2011-169597 A | 9/2011 |

OTHER PUBLICATIONS

Search Report issued Feb. 12, 2013 in co-pending GB Application No. 1218827.2.

Communication issued Jan. 5, 2015 in co-pending European Application No. 13188137.7.

* cited by examiner

DIAL GAUGE

BACKGROUND

The invention relates to a dial gauge comprising an illumination source below a dial plate, and a light guide arranged to guide illumination light from below the dial plate to the front side of the dial plate. In particular, although not exclusively, the invention relates to a mechanical pressure gauge including such a dial gauge.

Firefighters and other rescue personnel are often required to enter hazardous environments, such as burning buildings. In such circumstances, each firefighter is provided with a self-contained breathing apparatus (SCBA) which provides breathable gas to the firefighter. The breathing apparatus is typically provided with a mechanical pressure gauge for monitoring the remaining supply of breathable gas.

The mechanical pressure gauge is typically provided with an illumination source to illuminate the face of the dial plate so that the firefighter can read the gauge in low-light conditions. For example, it is known to provide a backlight behind a transparent or semi-transparent dial plate. It is also known to provide an illumination source around the periphery of a dial plate to illuminate the dial plate from its front side. Front side illumination sources may be used for opaque dial plates and for photoluminescent dial plates, which re-emit light after deactivation of illumination. Whilst dial gauges having such illumination arrangements may be satisfactory, they may require a plurality of illumination sources in order to provide relatively uniform illumination over the dial plate, which results in a relatively high power consumption. Further, in the case of photoluminescent dial plates, any non-uniform illumination of the dial face may lead to brighter glowing photoluminescent hot spots, which may make the dial gauge more difficult to read.

It is therefore desirable to provide an improved dial gauge having an improved arrangement for illuminating the dial plate.

SUMMARY

In one exemplary embodiment, the present invention comprises a mechanical pressure gauge comprising a dial gauge having a dial plate having a dial face including angularly spaced markings indicating pressure values, a pointer disposed at a front side of the dial plate and angularly moveable over the dial face with respect to the markings so as to indicate a reading, an illumination source arranged to emit illumination light and disposed below a central region of the dial plate, wherein the illumination source is visually obscured such that it cannot be viewed directly from above the dial plate, and an integrally formed optical light guide extending from underneath the dial plate to the front side of the dial plate and arranged to guide illumination light from below the dial plate to the front side of the dial plate so as to illuminate the dial face from above, the light guide comprising an annulus disposed underneath the dial plate and radially outwardly extending from a light input formed by the radially inner surface of the annulus, the illumination source being disposed within the central opening of the annulus, and a cylindrical wall optically coupled to the annulus and extending around the periphery of the dial plate and having a part projecting above the dial plate forming a light output.

Another exemplary embodiment of the present invention comprises a dial gauge, comprising a dial plate having a dial face including angularly spaced markings indicating values, a pointer disposed at a front side of the dial plate and angularly moveable over the dial face with respect to the markings so as to indicate a reading, an illumination source arranged to emit illumination light and disposed below the dial plate, and a light guide arranged to guide illumination light from below the dial plate to the front side of the dial plate so as to illuminate the dial face from above.

BRIEF DESCRIPTION OF THE DRAWINGS

For a better understanding of the invention, and to show how it may be carried into effect, reference will now be made, by way of example, to the accompanying drawings, in which.

DETAILED DESCRIPTION

Figure 1:
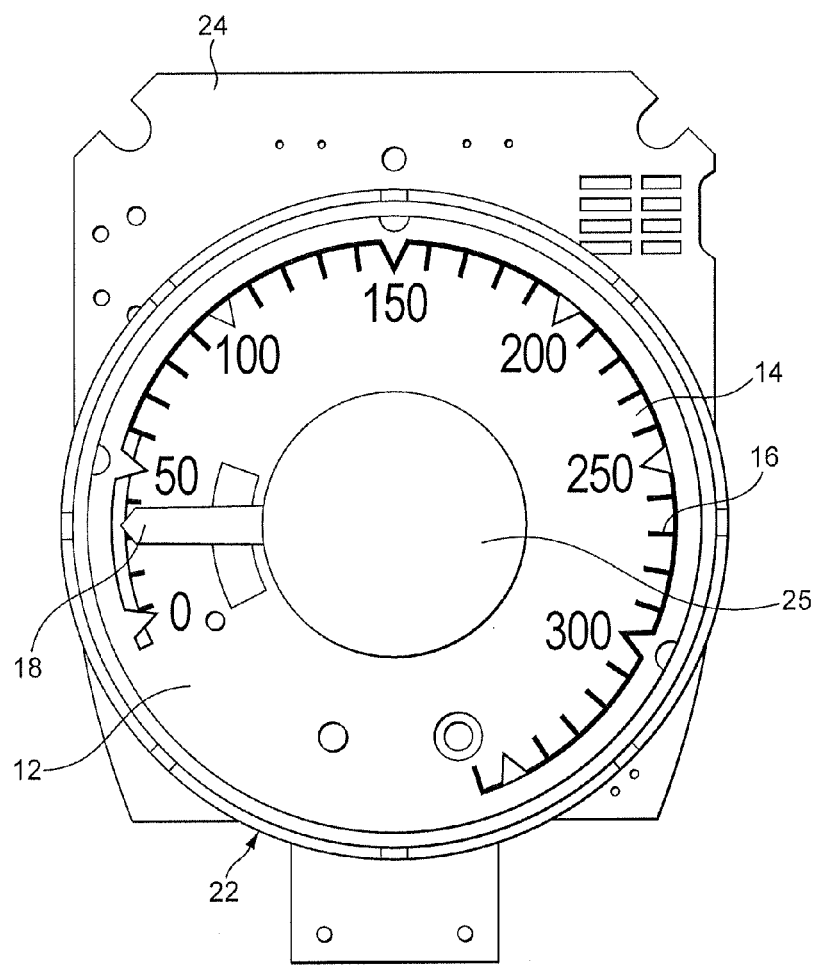
FIG. 1 schematically shows a front side view of a dial gauge.

In accordance with an aspect of the invention there is provided a dial gauge comprising a dial plate having a dial face including angularly spaced markings indicating values; a pointer disposed at a front side of the dial plate and angularly moveable over the dial face with respect to the markings so as to indicate a reading; an illumination source arranged to emit illumination light and disposed below the dial plate; and a light guide arranged to guide illumination light from below the dial plate to the front side of the dial plate so as to illuminate the dial face from above.

The light guide may be an optical light guide. The light guide may comprise or be made of an optical material. The light guide may comprise or be made of a solid optical material, for example glass or a plastic such as Perspex®. The light guide may be transparent. The light guide may be translucent. Providing a translucent light guide may allow illumination light to be distributed substantially uniformly.

The light guide may extend from below the dial plate to the front side of the dial plate. The light guide may extend from underneath the dial plate to the front side of the dial plate. The light guide may comprise a first portion disposed below the dial plate and radially outwardly extending from a light input proximal to the illumination source and arranged to receive illumination light, the first portion being arranged to radially outwardly distribute illumination light. At least a part of the first portion may be disposed underneath the dial plate. The first portion may be arranged to radially outwardly distribute illumination light in a plurality of angularly spaced radial directions. The first portion may be arranged to radially outwardly distribute illumination light in substantially all radial directions. The first portion may be planar or disc-like, and may lie in a plane below the dial plate which is substantially parallel to the dial plate. In this context, the phrase "underneath the dial plate" means directly below such that when viewed in plan from above the dial plate covers or obscures the part of the light guide below it.

The first portion may be an annulus, the radially inner surface of the annulus forming the light input. The illumination source may be located within the central opening of the annulus.

The light guide may comprise a second portion disposed towards the periphery of the dial plate and extending from below the dial plate to the front side of the dial plate and having a light output arranged to direct illumination light onto the dial face. The second portion may be optically coupled to the first portion and may be arranged to guide light from the first portion below the dial plate to the front side of the dial plate. The second portion may be axially extending. The second portion may be disposed outside of the dial plate.

The light output may be arranged to direct illumination light onto at least a peripheral region of the dial face. The light output may be arranged to direct illumination light onto at least a portion of the dial face comprising the markings indicating values. The light output may be arranged to direct illumination light onto substantially all of the dial face.

The second portion may be arranged to guide illumination light from the first portion below the dial plate to the front side of the dial plate in a plurality of angularly spaced positions. The second portion may be a cylindrical wall extending around the periphery of the dial plate and having a part projecting above the dial plate, at least a part of which forms the light output.

The light guide may comprise a central portion disposed towards and at least partly above the centre of the dial plate, the central potion having a light input proximal to the illumination source which is arranged to receive illumination light and a light output arranged to direct illumination light onto at least a central region of the dial face, wherein the central portion is arranged to guide illumination light from below the dial plate to the front side of the dial plate in a central region thereof. The central portion may comprise a disc disposed above the front face of the dial plate.

The first and second portions of the light guide may be structurally attached to each other. The first and second portions of the light guide may be integrally formed. The first portion and the central portion may be structurally attached to each other. The first and central portions of the light guide may be integrally formed. The light guide may be integrally formed.

The illumination source may be disposed below a central region of the dial plate. The dial plate may be an annulus and the illumination source may be disposed below the central opening of the annulus. The central portion of the light guide may pass through the central opening of the annulus.

The illumination source may comprise one or more individual light sources, such as one or more light-emitting diodes (LEDs). The illumination source may comprise a first light source arranged to emit illumination light of a first wavelength and a second light source arranged to emit illumination light of a second wavelength. The first light source and second light source may emit illumination light of different colours. The illumination source may comprise a single light source, such as a single LED. The illumination source may be located centrally with respect to the dial plate.

The dial plate may be opaque or translucent. The dial plate may be transparent.

The illumination source may be visually obscured such that it cannot be viewed directly from above the dial plate.

At least a portion of the dial face may be provided with a photoluminescent material. The markings of the dial face may be provided with a photoluminescent material. At least a part of the pointer may be provided with a photoluminescent material.

In accordance with a further aspect of the invention there is provided a mechanical pressure gauge comprising a dial gauge in accordance with any statement herein.

In accordance with a further aspect of the invention there is provided a breathing apparatus comprising a cylinder of breathable gas fluidically coupled to a pressure gauge in accordance with any statement herein which is configured to display the pressure of the breathable gas on the dial gauge.

In accordance with another aspect there is provided a mechanical pressure gauge, comprising: a dial gauge having: a dial plate having a dial face including angularly spaced markings indicating pressure values; a pointer disposed at a front side of the dial plate and angularly moveable over the dial face with respect to the markings so as to indicate a reading; an illumination source arranged to emit illumination light and disposed below a central region of the dial plate, wherein the illumination source is visually obscured such that it cannot be viewed directly from above the dial plate; and an integrally formed optical light guide extending from underneath the dial plate to the front side of the dial plate and arranged to guide illumination light from below the dial plate to the front side of the dial plate so as to illuminate the dial face from above, the light guide comprising: an annulus disposed underneath the dial plate and radially outwardly extending from a light input formed by the radially inner surface of the annulus, the illumination source being disposed within the central opening of the annulus; and a cylindrical wall optically coupled to the annulus and extending around the periphery of the dial plate and having a part projecting above the dial plate forming a light output.

The invention may comprise any combination of the features and/or limitations referred to herein, except combinations of such features as are mutually exclusive.

FIG. 1 shows a dial gauge 10 comprising a dial plate 12 having a dial face 14 provided with angularly spaced markings 16, and an angularly moveable pointer 18 which moves over the dial face 14 to indicate a reading. The dial gauge 10 further comprises an illumination source (not shown) located centrally behind and below the dial plate 12, and a light guide 22 arranged to direct illumination light from the illumination source to the front side of the dial plate 12 so as to illuminate the dial face 14.

In this embodiment the dial gauge 10 forms part of a mechanical pressure gauge comprising a fluid inlet and a pressure sensing mechanism (not shown). In use, the fluid inlet is fluidically connected to a gas cylinder of a self-contained breathing apparatus, and the pressure sensing mechanism adjusts the angular position of the pointer 18 depending on the pressure of the gas supply to indicate a reading on the dial face 14.

Figure 2:
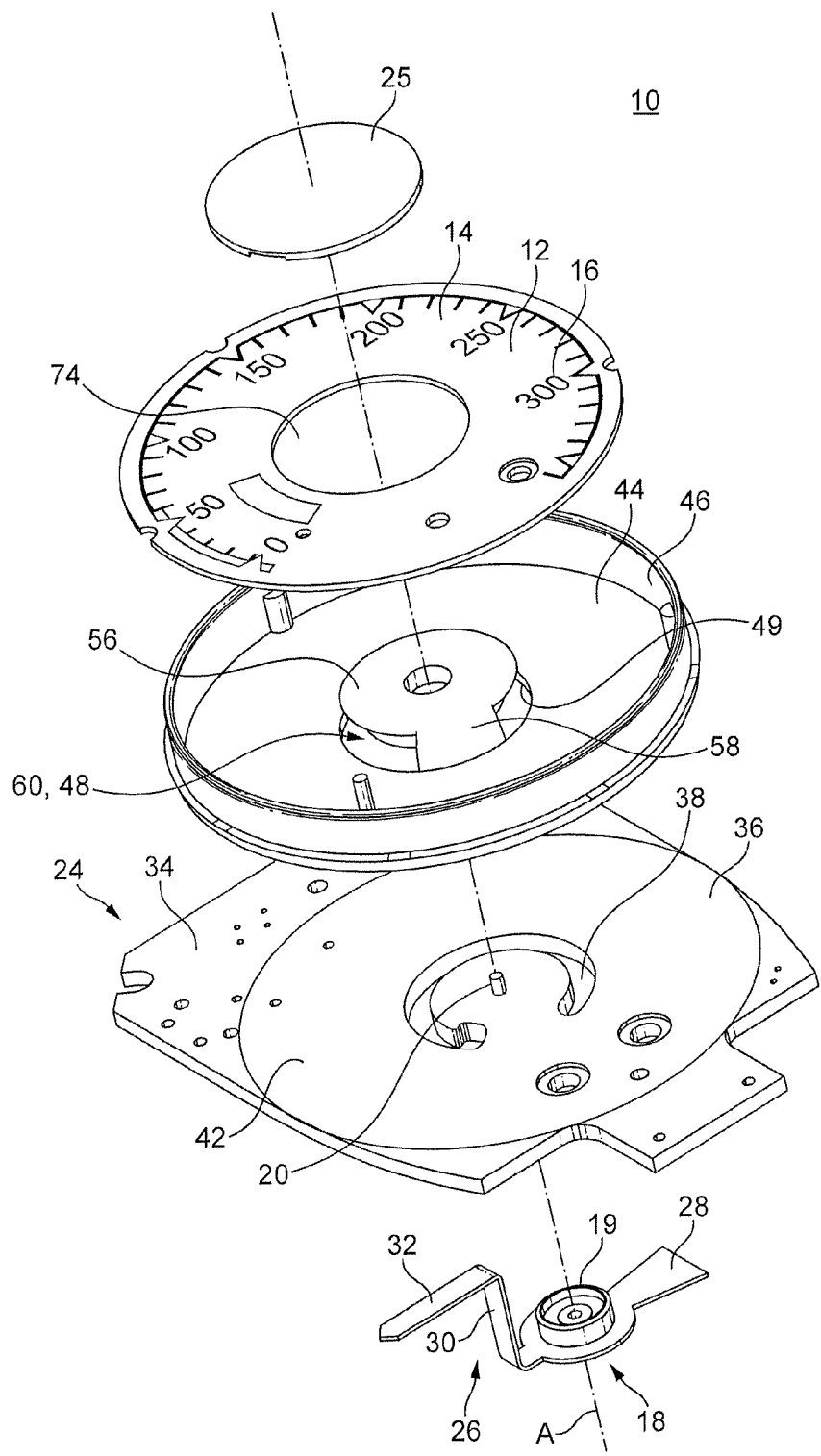
FIG. 2 schematically shows an exploded perspective view of the dial gauge of FIG. 1.

The dial gauge 10 will now be described in detail with reference to FIGS. 2 and 3. FIG. 2 shows in exploded view the dial gauge 10 including a circuit board 24, above which is disposed the light guide 22, the dial plate 12 and a cap 25. The pointer 18 is connected to the pressure sensing mechanism below the circuit board 24 and has an indicating portion 26 which extends through the circuit board 24, light guide 22 and dial plate 12 to the front side of the dial plate 12.

The pointer 18 comprises a central pivot portion 19 for connecting to a rotating member of the pressure sensing mechanism (not shown), such that the pointer 18 rotates about the pivot portion 19 in response to a change in pressure of the gas supply. The rotating member defines an axis A about which the pointer 18 rotates. The indicating portion 26 and a balance portion 28 radially extend from opposite sides of the central pivot portion 19. The indicating portion 26 is bent to form an axial portion 30 extending parallel to the axis A, which elevates the distal end of the indicating portion 26 (the needle 32) above the rest of the pointer 18. The axial portion 30 is arranged to extend through slots and openings formed in the circuit board 24, light guide 22 and dial plate 12, as will be described below. The needle 32 is disposed above the dial plate 12 and used to indicate a reading on the dial face 14. The balance portion 28 is provided to balance the pointer 18 about the axis A.

The circuit board 24 is configured to conform with and is connected to the internal profile of the pressure gauge housing (not shown). The circuit board 24 has a circular mounting portion 36 aligned with the axis A onto which the light guide 22 is mounted and abuts. The upper surface 42 of the mounting portion 36 which is in contact with the light guide 22 is reflective or is provided with a reflective layer. The mounting portion 36 has a circular arc (or horseshoe) slot 38 at its centre, concentric with the axis A, through which the axial portion 30 of the pointer 18 passes.

The illumination source 20 is mounted at the centre of the circuit board 24 and is substantially aligned with the axis A. In this embodiment the illumination source 20 comprises a white LED and a red LED, which are operable separately and which are connected to a power supply and controller (not shown).

The light guide 22 is an integrally formed piece of a solid optical material, such as a transparent plastic (e.g. Perspex®). The light guide 22 is substantially axisymmetric about the axis A and is mounted to the circuit board 24. The structure of the light guide 22 will be described in detail below.

The dial plate 12 is an annular plate having a central opening 74 concentric with the axis A and having an inner radius substantially equal to the outer radius of the horseshoe slot 38 formed in the circuit board 24. The dial plate 12 is mounted to the upper face of the light guide 22 so that the light guide 22 is sandwiched between the circuit board 24 and the dial plate 12. The underside of the dial plate 12 is in contact with the light guide 22 and is reflective, or is provided with a reflective layer. In this embodiment, the dial plate 12 is opaque such that illumination light emitted from the illumination source 20 cannot pass directly through it. The dial face 14 of the dial plate 12 is photoluminescent such that it can absorb illumination light and re-emit light so as to produce an afterglow. The photoluminescent dial face 14 is overlaid with markings 16, which in this embodiment are black to contrast with the photoluminescent dial face.

The light guide 22 comprises a first annular planar portion 44, a second cylindrical wall portion 46, and a third central portion 56. As will be described in detail below, the light guide 22 is provided to direct illumination light received from the illumination source 20 below the dial plate 12 to the front side of the dial plate 12, so as to illuminate the dial face 14 from above.

The annular planar portion 44 is mounted to the mounting portion 36 of the circuit board 24. The annular portion 44 defines a central opening 48 having a circumferentially extending inner surface 49 within which the illumination source 20 is disposed. Emitted illumination light can be received by the inner surface 49 which therefore acts as a light input. The radius of the opening 48 is substantially equal to the outer radius of the slot 38 formed in the circuit board 24. The annular portion 44 is disposed between and is in contact with both the circuit board 24 and the dial plate 12. As best shown in FIG. 3, the annular portion 44 extends radially outwardly below the dial plate 12 from the inner surface 49 proximal to the illumination source 20 towards a junction 50 at its radially outer end. The junction 50 comprises a chamfer 52 on the lower edge of the light guide 22 which tapers at approximately 45° downwardly and inwardly.

The cylindrical wall 46 axially extends upwardly from the junction 50 at the radially outer end of the annular portion 44. The cylindrical wall 46 extends around the entire periphery of the dial plate 12 and axially projects above it. The inner surface 82 of the cylindrical wall 46 acts as light output surface and is arranged to emit illumination light onto the dial face 14. The end face 47 of the cylindrical wall 46 also acts as a light output to emit illumination light.

The central portion 56 is supported axially above the opening 48 of the annular portion 44 by an integrally formed support 58 connected to the annular portion 44 (FIG. 2). The gap 60 between the central portion 56 and the annular portion 44 is aligned with and has substantially the same circumferential extent as the horseshoe slot 38 in the circuit board 24. This allows the axial portion 30 of the pointer 18 to pass through the circuit board 24 and the light guide 22. The support 58 passes through the opening 74 in the dial plate 12 so that the central portion 56 is disposed on the front side of the dial plate 12 and above it.

Figure 3:
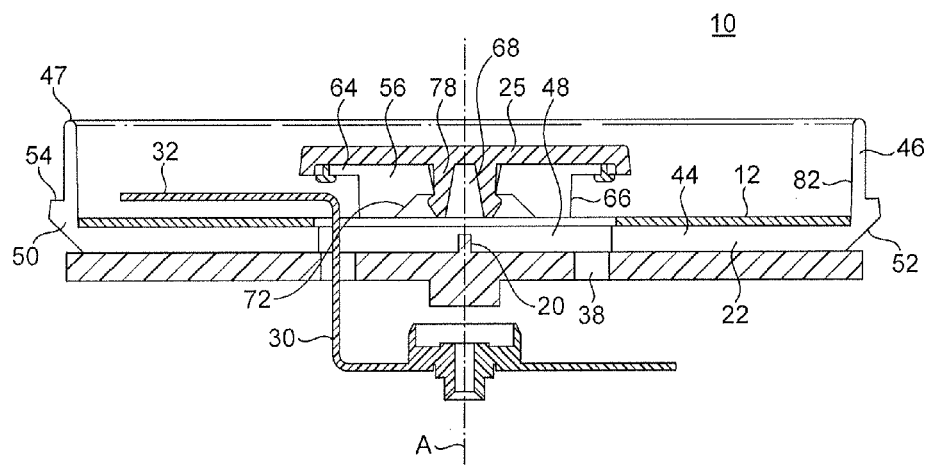
FIG. 3 schematically shows a cross-sectional side view of the dial gauge of FIG. 1, FIG. 4 schematically shows a cross-sectional side view of the dial gauge of FIG. 1, showing light paths through the light guide.

The central portion 56 is substantially axisymmetric about axis A and has an axially extending cylindrical wall 66 and a radially extending flange 64 disposed above and extending beyond the cylindrical wall 66 (FIG. 3). The outer radius of the flange 64 is substantially equal to the radius of the opening 48 in the annular portion 44. An axially extending hole 68 is provided through the central portion 56 which is concentric with the axis A and which inwardly tapers downwardly. The hole 68 opens into a cavity having a frustoconical side wall 72 forming a light input.

The cap 25 is opaque and is attached to and is disposed over the central portion 56 of the light guide 22 and acts to obscure the illumination source 20 from view. The cap 25 extends beyond the central portion 56 and has a radius substantially equal to the outer radius of the horseshoe slot 38 in the circuit board 24. The cap 25 is attached to the central portion 56 by a mounting peg 78 which forms a snap-fit connection with the tapered hole 68 of the central portion 56. The underside of the cap 25 is reflective, or is provided with a reflective layer.

The dial gauge 10 further comprises control circuitry for selectively activating and deactivating the white LED or the red LED of the illumination source 20. The control circuitry may be configured to automatically activate the illumination source 20 when the SCBA is in use and/or when low lighting conditions are detected. The illumination source 20 may be manually activated by a button on the dial gauge 10 or elsewhere on the SCBA. The control circuitry may be configured to activate the white LED when the gas pressure detected is above a threshold level, and activate the red LED when the gas pressure detected is below the threshold. The control circuitry may be configured to intermittently activate one LED, or both LEDs in sequence, for example to alert the user when the pressure is at or below a safety threshold. In addition, the dial gauge 10 further comprises other components not described in detail including a transparent cover over the dial plate, means for providing electric power to the illumination source, circuitry and buttons for manually and/or automatically activating the illumination source 20.

Figure 4:
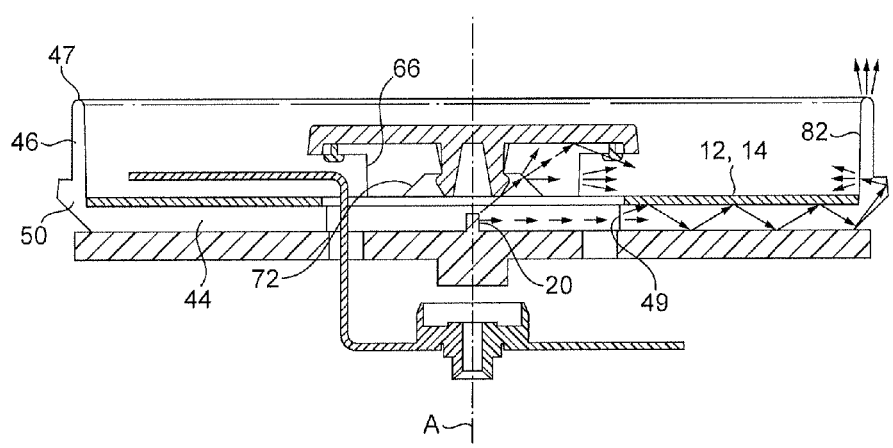

Referring now to FIG. 4, when the illumination source 20 is activated the light guide 22 directs illumination light emitted from the illumination source 20 from below the dial plate 12 to the front side of the dial plate 12 so as to illuminate the dial face 14. The illumination light emitted below the dial plate 12 is received by the light input formed by the inner surface 49 of the annular portion and the frustoconical side wall 72 of the central potion 56, and is guided above the dial plate 12 where it is emitted onto the dial face 14 from the light output formed by the inner surface 82 of the cylindrical wall 46 and the cylindrical wall 66 and flange 64 of the central portion 56. The light guide 22 therefore causes the dial face 14 to be uniformly illuminated from above the dial plate 12, using an illumination source disposed centrally below the dial plate 12.

The light input formed by the inner surface 49 of the annular portion 44 proximal to the illumination source 20 receives illumination light emitted from the illumination source 20 in all directions. The annular portion 44 guides the received illumination light radially outwardly and uniformly distributes it in all radial directions by internal reflection. The reflective surfaces of the dial plate 12 and the circuit board 24 help to guide the light outwards. At the junction 50, the radially travelling illumination light is reflected by the chamfer 52 by approximately 90° into the cylindrical wall 46 such that it travels in a general axial direction. The cylindrical wall 46 guides the illumination light in the axial direction from below the dial plate 12 to above the dial plate 12. The optical properties of the cylindrical wall 46 are configured such that above the dial plate 12, some illumination light is emitted from the inner surface 82 of the cylindrical wall 46 and directed onto the dial face 14, and some illumination light is emitted from the end face 47 of the cylindrical wall 46. The inner surface 82 and annular end 47 of the cylindrical wall 46 therefore act as light outputs of the light guide 22. The annular portion 44 and the cylindrical wall 46 of the light guide 22 act to guide illumination light radially outwardly towards the periphery of the dial plate 12 and to the front side of the dial plate 12 so as to uniformly illuminate the entire peripheral region of the dial face 14 from the front side.

Similarly, the light input formed by the frustoconical side wall 72 proximal to the illumination source 20 receives illumination light emitted from the illumination source in all directions. The cylindrical wall 66 guides the illumination light towards the flange 64, and some illumination light is emitted from the outer surface of the cylindrical wall 66 and directed onto the dial face 14, and some illumination light is emitted from the flange 64 and directed onto the dial face 14. The flange 64 and cylindrical wall 66 therefore act as light outputs of the light guide 22. The central portion 56 of the light guide 22 acts to guide illumination light to the front side of the dial plate 12 so as to uniformly illuminate a central region of the dial face from the front side.

The inner surface 82 of the cylindrical wall 46, the outer surface of the cylindrical wall 66 and the flange 64 are provided with diffusion surfaces which tend to diffuse the illumination light causing it to be emitted in a number of directions. The diffusion surface may be a diffusion layer or a surface finish which tends to diffuse the illumination light, such as a roughened surface. The annular end face 47 may also be provided with a diffusion surface. Although not described, the light guide 22 may also be provided with reflective materials on the outer surfaces of the junction 50 and cylindrical wall 46 to ensure that the illumination light travels through the light guide 22 and does not escape through the outer surface of these parts.

Since the light guide 22 is axisymmetric and receives illumination light from all directions, the illumination light is uniformly distributed. Further, the diffusion surfaces of the light outputs diffuse the illumination light over the dial face 14 to illuminate the dial face 14 in the desired manner.

The invention allows the dial face 14 to be uniformly illuminated from above using a single illumination source 20 disposed below the dial plate 12. This negates the need for a plurality of illumination sources distributed around the front of the dial plate 12 resulting in a cost saving and a power saving when in use. Embodiments of the invention may use a single illumination source, for example a single LED, thereby resulting in a very low power consumption. Further, the invention may be particularly beneficial for dial plates 12 which may not be suitable for backlighting, such as opaque or translucent dial plates.

The light guide 22 uniformly distributes the illumination light over the dial face 14 since the paths and distances travelled by the illumination light from the illumination source 20 are substantially the same in all directions. In other words, the lighting arrangement is substantially axisymmetric. The uniform distribution of illumination light may be particularly beneficial for photoluminescent dial faces since it may reduce photoluminescent hot spots, which can make the dial gauge difficult to read.

If the dial plate 12 and cap 25 are opaque, the illumination source 20 cannot be viewed directly from the front side of the dial gauge. Instead, the illumination light is radially distributed and is guided from below to above the dial plate 12 by the light guide 22 which uniformly illuminates at least certain regions of the dial face 14. Therefore, the illumination source 20 does not directly illuminate the dial face 14.

Providing the pointer 18 below the circuit board 24 and light guide 22, with an axial portion 30 which extends through the circuit board 24, light guide 22 and dial plate 12 to support the needle 32 at a position offset from the axis A enables the specific structure described above wherein the illumination source 20 is centrally located. In typical dial gauge arrangements, a shaft is disposed along the axis to support a needle mounted above the dial plate, and so it would not be possible to centrally locate an illumination source 20 below the dial plate.

The invention allows the same illumination method to be used for opaque, translucent, transparent dial faces, and photoluminescent dial faces, since all types of dial faces are suitable for being illuminated from above.

While an embodiment of the invention has been described in which the various portions of the light guide are integrally formed, it will be appreciated that in other embodiments the light guide may comprise separate portions which are optically coupled together.

While an embodiment of the invention has been described in which the cap is opaque and provided with a reflective underside, it will be appreciated that in other embodiments the cap could be at least partly translucent and provided without a reflective layer over at least a portion of its underside so as to direct illumination light directly from the cap to the user, if desired.

The term axisymmetric is used in the present disclosure to specify that a component has rotational symmetry about an axis with respect to any angle.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention. This disclosure is intended to cover any adaptations or variations of the embodiments discussed herein.

The invention claimed is:

1. A mechanical pressure gauge, comprising:
   a dial gauge having:
      a dial plate having a dial face including angularly spaced markings indicating pressure values;
      a pointer disposed at a front side of the dial plate and angularly moveable over the dial face with respect to the markings so as to indicate a reading;
      an illumination source arranged to emit illumination light and disposed below a central region of the dial plate, wherein the illumination source is visually obscured such that it cannot be viewed directly from above the dial plate; and an integrally formed optical light guide extending from underneath the dial plate to the front side of the dial plate and arranged to guide illumination light from below the dial plate to the front side of the dial plate so as to illuminate the dial face from above, the light guide comprising:

a cylindrical wall portion extending around the periphery of the dial plate and having a part projecting above the dial plate forming a light output; and an annulus portion optically coupled to the cylindrical wall portion and disposed directly underneath the dial plate radially inwardly of the cylindrical wall portion, the annulus portion radially outwardly extending from a light input formed by the radially inner surface of the annulus portion, the illumination source being disposed within the central opening of the annulus portion so that illumination light emitted along a substantially radial direction from the illumination source is received at the light input, wherein the pointer is connected to a rotating member disposed below the light guide which defines a rotation axis for rotation of the pointer; and wherein the illumination source is substantially aligned with said rotation axis.

2. A dial gauge, comprising:

a dial plate having a dial face including angularly spaced markings indicating values;

an illumination source arranged to emit illumination light and disposed below a central region of the dial plate;

a light guide arranged to guide illumination light from below the dial plate to the front side of the dial plate so as to illuminate the dial face from above, wherein the light guide extends from below to the front side of the dial plate the light guide including an annulus portion disposed directly underneath the dial plate and radially outwardly extending from a light input formed by the radially inner surface of the annulus portion; and a pointer disposed at a front side of the dial plate and angularly moveable over the dial face with respect to the markings so as to indicate a reading, wherein the pointer is connected to a rotating member disposed below the light guide which defines a rotation axis for rotation of the pointer;

wherein the illumination source is disposed in the central opening of the annulus portion so that illumination light emitted along a substantially radial direction from the illumination source is received at the light input and distributed radially outwardly through the annulus portion; and wherein the illumination source is substantially aligned with said rotation axis.

3. A dial gauge according to claim 2, wherein the light guide is an optical light guide.

4. A dial gauge according to claim 2, wherein the light input is proximal to the illumination source.

5. A dial gauge according to claim 4, wherein the annulus portion is arranged to radially outwardly distribute light in a plurality of angularly spaced radial directions.

6. A dial gauge according to claim 4, wherein the light guide comprises a second portion disposed towards the periphery of the dial plate and extending from below the dial plate to the front side of the dial plate and having a light output arranged to direct illumination light onto the dial face, wherein the second portion is coupled to the annulus portion and is arranged to guide light from the annulus portion below the dial plate to the front side of the dial plate.

7. A dial gauge according to claim 6, wherein the light output is arranged to direct illumination light onto at least a peripheral region of the dial face.

8. A dial gauge according to claim 6, wherein the second portion is arranged to guide light from the annulus portion below the dial plate to the front side of the dial plate in a plurality of angularly spaced positions.

9. A dial gauge according to claim 6, wherein the second portion is a cylindrical wall extending around the periphery of the dial plate and having a part projecting above the dial plate, at least a part of which forms the light output.

10. A dial gauge according to claim 2, wherein the light guide comprises a central portion disposed towards and at least partly above the centre of the dial plate, the central potion having a light input proximal to the illumination source which is arranged to receive illumination light and a light output arranged to direct illumination light onto at least a central region of the dial face, wherein the central portion is arranged to guide illumination light from below the dial plate to the front side of the dial plate in a central region thereof.

11. A dial gauge according to claim 2, wherein the illumination source comprises a first light source arranged to emit illumination light of a first wavelength and a second light source arranged to emit illumination light of a second wavelength.

12. A dial gauge according to claim 2, wherein the dial plate is opaque or translucent.

13. A dial gauge according to claim 2, wherein the illumination source is visually obscured such that it cannot be viewed directly from above the dial plate.

14. A breathing apparatus comprising a cylinder of breathable gas fluidically coupled to a dial gauge in accordance with claim 2 which is configured to display the pressure of the breathable gas on the dial gauge.

15. A dial gauge according to claim 2, wherein the pointer extends from below the light guide to the front side of the dial plate, and wherein the pointer comprises an axial portion extending from below the light guide and through the light guide and the dial plate.

16. A dial gauge according to claim 15, wherein each of the light guide and dial plate comprise an arcuate slot through which the axial portion of the pointer extends.

17. A dial gauge according to claim 16, wherein each arcuate slot is horseshoe-shaped.

18. A dial gauge according to claim 15, wherein the pointer comprises an indicating portion including the axial portion and a distal portion, wherein the axial portion extends through the light guide and dial plate so that the distal portion is elevated above the dial plate.

19. A dial gauge according to claim 15, wherein the axial portion extends parallel with the rotation axis.

20. A dial gauge according to claim 15, wherein the pointer is coupled to the rotating member at a position below the illumination source.

* * * * *